UNITED STATES PATENT OFFICE.

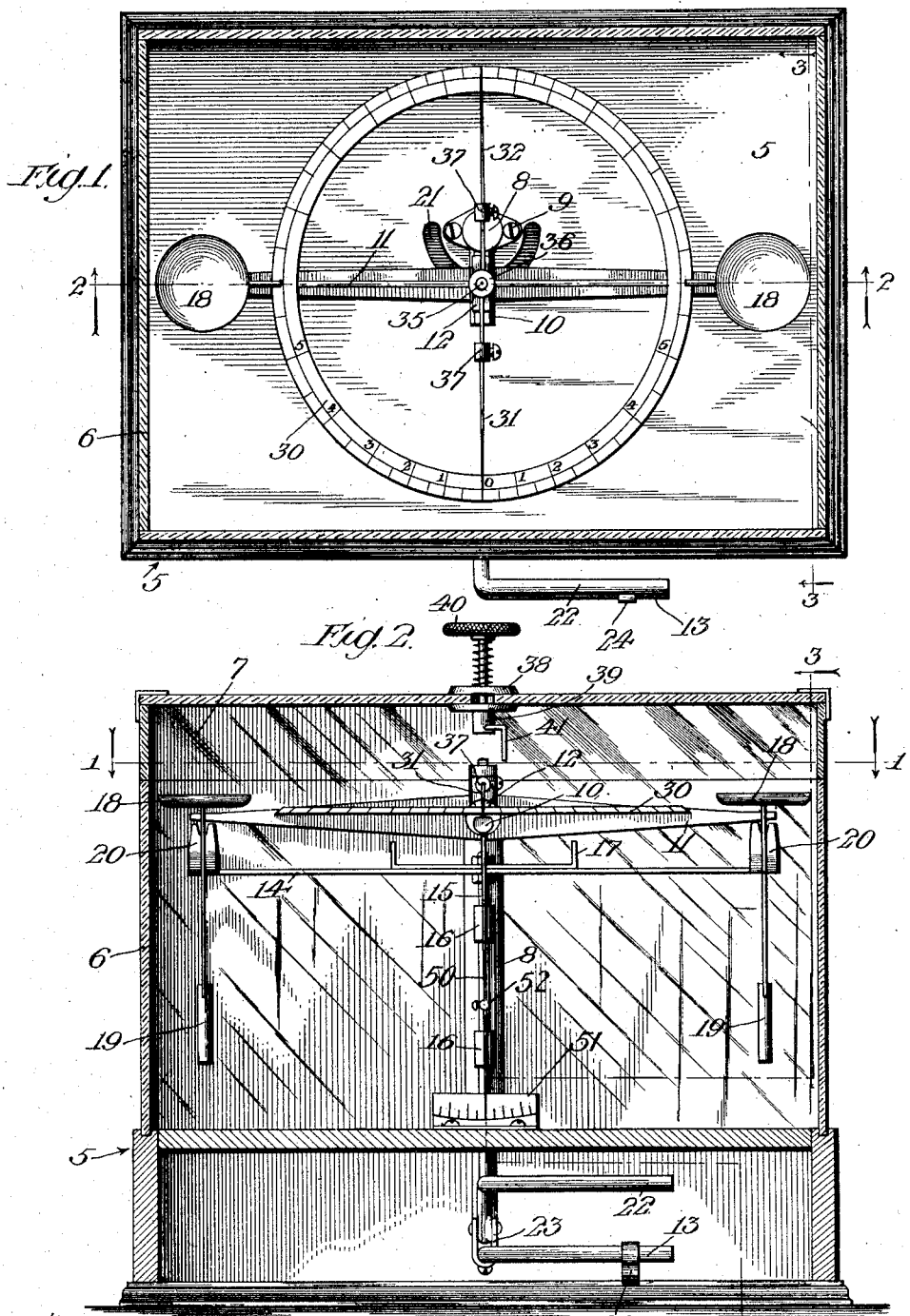

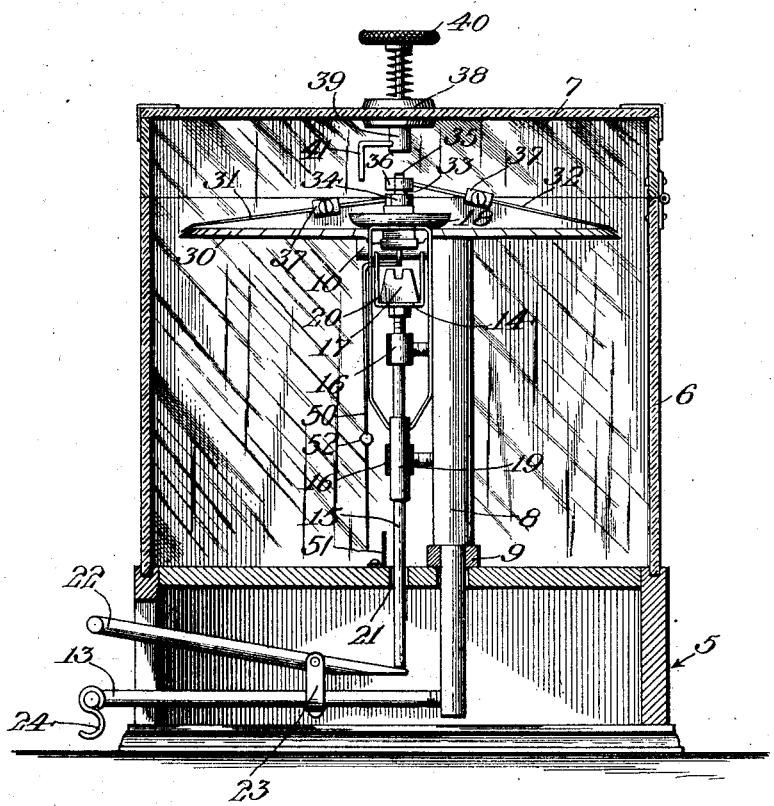

ERWIN M. WADE, OF LOS ANGELES, CALIFORNIA.

SCALE.

No. 876,286.  Specification of Letters Patent.  Patented Jan. 7, 1908.

Application filed June 10, 1907. Serial No. 378,120.

*To all whom it may concern:*

Be it known that I, ERWIN M. WADE, a citizen of the United States, residing at Los Angeles, in the county of Los Angeles and State of California, have invented new and useful Improvements in Scales, of which the following is a specification.

The object of my invention is to provide scales with novel form of rider weight and scale therefor and also with mechanism to enable the position of the weight on the scale to be accurately read. I accomplish this object by means of the device described herein and illustrated in the accompanying drawings, in which:—

Figure 1— is a sectional plan view of my improved scales taken on line 1—1 of Fig. 2. Fig. 2— is a vertical section taken on line 2—2 of Fig. 1. Fig. 3— is a vertical section taken on lines 3—3 of Figs. 1 and 2.

Referring to the drawings, 5 represents a hollow scale base surmounted by a glass case 6 provided with a hinged glass top 7. On base 5 in stepped bearing 9 is mounted a vertical standard 8 supporting at its upper end a horizontal arm 10 upon which scale beam 11 is supported on knife edges 12. Standard 8 projects through the top of base 5 and has a horizontal arm 13 secured to its lower end by means of which it may be turned to any position desired. A horizontal supporting bar 14 is operated from a vertical shaft 15 journaled in bearings 16 secured to standard 8, and is provided with plate 17 adapted to raise the scale beam from its position on arm 10 while the scale is not in use. Pans 18 are provided on each end of the scale beam being preferably placed above the beam with balancing weights 19 hung below. The weights are placed in the pans by raising top 7 which renders easy access to the same.

Supporting bar 14 is provided with upturned ends 20 adapted to lift the pans off the scale beam when the scales are not in use. Vertical shaft 15 passes through annular slot 21 in the top of base 5 and its lower end rests upon lever 22 pivoted in bearings 23 secured by horizontal arm 13. Both lever 22 and arm 13 are bent at right angles at their outer ends as best shown in Fig. 1 and arm 13 is provided with a hook 24 adapted to be turned over lever 22 and hold the same in position close to arm 13. In this position shaft 15 is raised to its highest position and the scale pans and scale beam are lifted off their respective bearings.

Scale beam 11 is provided with a horizontal circle 30 against which two centrally pivoted pointers 31 and 32 are adapted to be read. Pointer 31 is pivoted directly above the center of the scale beam on a stud 33 surrounded by a collar 34 to which it is attached, and pointer 32 is pivoted directly above the pivoted pointer 31 on stud 35 surrounded by a collar 36 to which it is attached. Both pointers are provided with an adjustable weight 37 which may be moved to adjust the reading of the scales. Directly above the center of the scale beam and secured to top 7 of glass case 6 is a boss 38 carrying a spring supported vertical stud 39 provided on its top end with a thumb nut 40 and on its lower end with a finger 41 adapted to engage with pointers 31 and 32. Thumb nut 40 is pressed downwardly against the pressure of the spring and is then turned to contact with either of the pointers and to move it to the required reading on the circular scale. The circle is graduated so as to read from the zero position at which the pointers are shown in the drawings in both directions and the readings are directly in weight units. In order that each division shall read an equal amount the divisions increase in length from the center. Beam 11 is provided with the usual pointer 50 adapted to be read against scale 51 secured to base 5. An adjustable weight 52 on pointer 50 provides means to adjust the sensitiveness of the beam.

It will be observed that I have produced a scale which is capable of finer graduations and therefore more accurate reading than the same scale with the ordinary horizontal bar and rider weight attached thereto. It will be also noted that the pointers which take the place of the ordinary rider weight may be moved very easily and accurately and will remain in the position where they are placed without any need of a detent. It will further be observed that by turning the scales bodily the reading point on the circle may be always kept directly in front of the operator so that the position of the pointers may be always read accurately.

I do not restrict myself to the particular form of balances illustrated in the drawings, but my circular scale with revoluble pointers may be adapted to any beam balances.

Having described my invention what I claim as new and desire to secure by Letters Patent is:—

1. In a scale, a beam, supports for said beam, a plurality of horizontally revoluble pointers centrally pivoted on said beam, adjustable weights on said pointers, and a horizontal reading circle for said pointers, said pointers adapted to be placed in positions opposite each other transversely across said beam.

2. In a scale, a beam, a revoluble support for said beam, means to revolve said support, a plurality of revoluble pointers centrally pivoted on said beam, and a reading circle for said pointers, said pointers adapted to be placed in positions opposite each other transversely across said beam.

3. In a scale, a beam, a revoluble support for said beam, means to revolve said support, a plurality of horizontally revoluble pointers centrally pivoted on said beam, a horizontal circular scale secured to said beam upon which the position of the pointers is adapted to be read, and means to revolve said pointers, said pointers adapted to be placed in positions opposite each other transversely across said beam.

4. In a scale, a case, a vertical standard mounted in said case, a horizontal arm secured to said standard whereby said standard may be revolved, a scale beam pivotally mounted on said standard, a plurality of horizontally revoluble pointers centrally pivoted on said beam, a horizontal reading scale for said pointers rigidly attached to said beam, and a horizontally revoluble finger pivotally attached to said case and adapted to contact with said pointers, said pointers adapted to be placed in positions opposite each other transversely across said beam.

5. In a scale, a case, a vertical standard revolubly mounted in said case, a horizontal arm secured to said standard whereby the same may be revolved, a scale beam pivotally mounted on said standard, a pair of horizontally revoluble pointers centrally mounted on said beam, a circular scale rigidly mounted on said beam and on which the positions of said pointers are adapted to be read, and means to revolve said pointers to positions opposite each other transversely across said beam.

In witness that I claim the foregoing I have hereunto subscribed my name this 25th day of May, 1907.

ERWIN M. WADE.

Witnesses:
TRIMBLE BARKELEW,
MYRTLE A. JONES.